United States Patent
Yoshii et al.

(10) Patent No.: US 12,543,763 B2
(45) Date of Patent: Feb. 10, 2026

(54) NON-ALCOHOLIC BEER-FLAVORED BEVERAGE, METHOD FOR PRODUCING NON-ALCOHOLIC BEER-FLAVORED BEVERAGE, AND METHOD FOR IMPROVING QUALITY OF BITTERNESS OF NON-ALCOHOLIC BEER-FLAVORED BEVERAGE

(71) Applicant: SUNTORY HOLDINGS LIMITED, Osaka (JP)

(72) Inventors: Takaaki Yoshii, Kyoto (JP); Yohei Fujita, Kyoto (JP); Hitoshi Matsubara, Kyoto (JP); Yuto Hata, Kyoto (JP)

(73) Assignee: SUNTORY HOLDINGS LIMITED, Osaka (JP)

( * ) Notice: Subject to any disclaimer, the term of this patent is extended or adjusted under 35 U.S.C. 154(b) by 271 days.

(21) Appl. No.: 18/037,791

(22) PCT Filed: Dec. 8, 2021

(86) PCT No.: PCT/JP2021/045088
§ 371 (c)(1),
(2) Date: May 19, 2023

(87) PCT Pub. No.: WO2022/138161
PCT Pub. Date: Jun. 30, 2022

(65) Prior Publication Data
US 2023/0413863 A1    Dec. 28, 2023

(30) Foreign Application Priority Data
Dec. 25, 2020 (JP) .................. 2020-217077

(51) Int. Cl.
*A23L 2/52* (2006.01)
*A23L 27/00* (2016.01)

(52) U.S. Cl.
CPC ................ *A23L 2/52* (2013.01); *A23L 27/86* (2016.08)

(58) Field of Classification Search
CPC ........ A23L 33/105; A23L 2/385; A23L 27/86; A23L 2/56; A23L 2/38
USPC .................................................. 426/600, 590
See application file for complete search history.

(56) References Cited

FOREIGN PATENT DOCUMENTS

| | | | |
|---|---|---|---|
| EP | 3556217 | A1 | 10/2019 |
| EP | 3 991 572 | A1 | 5/2022 |
| EP | 4 029 383 | A1 | 7/2022 |
| JP | H07250644 | A * | 10/1995 |
| JP | 2002-27968 | A | 1/2002 |
| JP | 2005-185169 | A | 7/2005 |
| JP | 2014-168383 | A | 9/2014 |
| JP | 2017-93341 | A | 6/2017 |
| JP | 2020-054291 | A | 4/2020 |
| JP | 2021-106517 | A | 7/2021 |
| JP | 2021-106539 | A | 7/2021 |
| WO | 2013/072332 | A1 | 5/2013 |
| WO | 2017/090090 | A1 | 6/2017 |
| WO | 2018/110278 | A1 | 6/2018 |
| WO | 2020/157890 | A1 | 8/2020 |
| WO | 2020/262232 | A1 | 12/2020 |
| WO | 2021/049074 | A1 | 3/2021 |

OTHER PUBLICATIONS

Hayashi Izumi et al., JP-H07250644, Machine Translation, English, Oct. 3, 1995, pp. 1-4. (Year: 1995).*
Takoi Kiyoshi et al. JP 2014168383, Machine Translation, English, Sep. 18, 2014, pp. 1-10. (Year: 2014).*
International Search Report dated Jan. 18, 2022, issued in counterpart International Application No. PCT/JP2021/045088. (3 pages).

* cited by examiner

*Primary Examiner* — Hong T Yoo
(74) *Attorney, Agent, or Firm* — WHDA, LLP

(57) ABSTRACT

The present invention aims to provide a non-alcoholic beer-taste beverage having an improved quality of bitterness. The present invention provides a non-alcoholic beer-taste beverage having an iso-α-acid content of 15 to 60 ppm and an ethyl glucoside content of 5 to 50 ppm, wherein a ratio of iso-α-acid to ethyl glucoside, i.e., iso-α-acid/ethyl glucoside, is 6.0 or less.

4 Claims, No Drawings

NON-ALCOHOLIC BEER-FLAVORED BEVERAGE, METHOD FOR PRODUCING NON-ALCOHOLIC BEER-FLAVORED BEVERAGE, AND METHOD FOR IMPROVING QUALITY OF BITTERNESS OF NON-ALCOHOLIC BEER-FLAVORED BEVERAGE

TECHNICAL FIELD

The present invention relates to a non-alcoholic beer-taste beverage, a method of producing a non-alcoholic beer-taste beverage, and a method of improving the quality of bitterness of a non-alcoholic beer-taste beverage.

BACKGROUND ART

Diversification of consumer preferences in recent years has created a demand for development of non-alcoholic beer-taste beverages having various aroma and taste characteristics.

Patent Literature 1 discloses a non-alcoholic beer-taste beverage containing γ-aminobutyric acid and iso-α-acid, wherein the γ-aminobutyric acid content is 500 ppm or less, and the iso-α-acid content is 5 ppm or more.

CITATION LIST

Patent Literature

Patent Literature 1: WO 2017/090090

SUMMARY OF INVENTION

Technical Problem

Conventional non-alcoholic beer-taste beverages give a bitter aftertaste in some cases, and such a bitter aftertaste is not preferable.

Non-alcoholic beer-taste beverages will taste bland if the bitterness is simply eliminated, for example, by adding a component that masks the bitter aftertaste.

The bitterness of a non-alcoholic beer-taste beverage is not an issue by itself. Rather, the issue is the quality of bitterness. A sharp bitterness without a bitter aftertaste is preferred.

In other words, there has been a demand for improvement in the quality of bitterness of conventional non-alcoholic beer-taste beverages.

In response to the demand described above, the present invention aims to provide a non-alcoholic beer-taste beverage having an improved quality of bitterness.

Solution to Problem

Specifically, the present invention relates to a non-alcoholic beer-taste beverage, a method of producing a non-alcoholic beer-taste beverage, and a method of improving the quality of bitterness of a non-alcoholic beer-taste beverage, which are described below.

(1) A non-alcoholic beer-taste beverage having an iso-α-acid content of 15 to 60 ppm and an ethyl glucoside content of 5 to 50 ppm, wherein a ratio of iso-α-acid to ethyl glucoside, i.e., iso-α-acid/ethyl glucoside, is 6.0 or less.

(2) The non-alcoholic beer-taste beverage according to (1), wherein the iso-α-acid content is 20 to 30 ppm; and the ethyl glucoside content is 10 to 25 ppm.

(3) A method of producing a non-alcoholic beer-taste beverage, including: adjusting an iso-α-acid concentration and an ethyl glucoside concentration in a non-alcoholic beer-taste beverage such that the non-alcoholic beer-taste beverage has an iso-α-acid content of 15 to 60 ppm, an ethyl glucoside content of 5 to 50 ppm, and a ratio of iso-α-acid to ethyl glucoside, i.e., iso-α-acid/ethyl glucoside, of 6.0 or less.

(4) A method of improving quality of bitterness of a non-alcoholic beer-taste beverage, including: adding iso-α-acid and ethyl glucoside to a non-alcoholic beer-taste beverage such that the non-alcoholic beer-taste beverage contains 15 to 60 ppm iso-α-acid and 5 to 50 ppm ethyl glucoside at a ratio of iso-α-acid to ethyl glucoside, i.e., iso-α-acid/ethyl glucoside, of 6.0 or less.

Advantageous Effects of Invention

The present invention can provide a non-alcoholic beer-taste beverage with an improved quality of bitterness.

DESCRIPTION OF EMBODIMENTS

The term "non-alcoholic beer-taste beverage" refers to a beer-taste beverage having an alcohol content of less than 1%, preferably one containing substantially no alcohol. The alcohol content may be 0%.

The beer-taste beverage is a beer-flavored carbonated beverage.

Beverages containing substantially no alcohol include beverages containing an undetectable trace amount of alcohol. Beverages having an alcohol content rounded to 0.0%, particularly those having an alcohol content rounded to 0.00%, are included in non-alcoholic beer-taste beverages. Examples of the non-alcoholic beer-taste beverage of the present invention include non-alcoholic beer-taste beverages and beer-taste soft drinks. The term "alcohol content" as used herein means the ethanol content, with aliphatic alcohols other than ethanol being excluded.

The alcohol content of the non-alcoholic beer-taste beverage of the present invention means the concentration (v/v %) of the alcohol in the beverage, and the alcohol content can be measured by any known method. For example, it can be measured using a vibrating density meter. Specifically, a beverage is filtered or sonicated to prepare a sample from which carbon dioxide has been removed. The sample is distilled over open fire to obtain a distillate. The density of the distillate at 15° C. is measured. The density is then converted to the alcohol content using an appendix "Table 2: Table of Conversion between Alcohol Content and Density (15° C.) or Specific Gravity (15/15° C.)" of the Official Analysis Method of National Tax Agency of Japan (National Tax Agency Directive No. 6 in 2007, revised on Jun. 22, 2007). When the alcohol content is less than 1.0%, a commercially available alcohol measuring instrument or a gas chromatograph may be used.

The non-alcoholic beer-taste beverage of the present invention may or may not contain malt in its ingredients.

The term "ingredients" as used herein means grains and sugars. Water and hops are excluded.

The ingredients may include malt, rice, corn, sorghum, potato, starch, and cereal grains other than malt. Components that may be added in trace amounts, such as acidulants, sweeteners, bittering agents, seasonings, and flavorings, are not included in the ingredients. The extract weight in the non-alcoholic beer-taste beverage of the present invention is not limited but is preferably 0.01 to 20.0 wt %.

Iso-α-acid is a component in the form of isomerized a acid.

Iso-α-acid derived from hops may be used, or iso-α-acid extracted from hops may be added. Alternatively, a commercially available iso-α-acid formulation may be added. Examples of the commercially available iso-α-acid formulation include ISOHOP (John I. HAAS).

Any known technique can be used for extraction from hops.

The iso-α-acid content can be measured in accordance with Method 7.7 specified in the regulations for analytical methods "Analytica-EBC" issued by European Brewery Convention (EBC).

The iso-α-acid content of the non-alcoholic beer-taste beverage of the present invention is 15 to 60 ppm, preferably 15 to 45 ppm, more preferably 15 to 30 ppm, still more preferably 20 to 30 ppm.

Ethyl glucoside is a compound having a structure in which a hydroxy group attached to the carbon atom at position 1 of glucose is replaced by an ethoxy group. The glucose in ethyl glucoside may be either D-glucose or L-glucose, preferably D-glucose. Ethyl glucoside may be either ethyl-α-glucoside or ethyl-β-glucoside, or may be a combination of ethyl-α-glucoside and ethyl-β-glucoside. In the present invention, ethyl glucoside may be ethyl-α-glucoside and/or ethyl-β-glucoside. Preferably, ethyl glucoside is ethyl-α-glucoside.

The ethyl glucoside content of a beverage can be measured by high performance liquid chromatography (HPLC) under the following conditions.

High performance liquid chromatography: LC-2030C (Shimadzu Corporation)
Corona detector: CORONA Ultra (Thermo Fisher Scientific K.K.)
Column: COSMOSIL HILIC (Nacalai Tesque, Inc., inner diameter: 4.6 mm; length: 150 mm)
Mobile phase (A): Water
Mobile phase (B): Acetonitrile
Flow rate: 0.5 mL/min
Bconc.: 80%
Oven temperature: 40° C.

The ethyl glucoside content of the non-alcoholic beer-taste beverage of the present invention is 5 to 50 ppm, preferably 10 to 30 ppm, more preferably 10 to 25 ppm.

In the non-alcoholic beer-taste beverage of the present invention, the iso-α-acid content and the ethyl glucoside content are set in the predetermined ranges. A non-alcoholic beer-taste beverage having an improved quality of bitterness with a sharp bitterness without a bitter aftertaste can be provided by setting the amounts of these two components in the predetermined ranges.

The term "quality of bitterness" as used herein is an index that depends on the presence or absence of bitter aftertaste and the presence or absence of sharp bitterness. The quality of bitterness is determined to be good when the bitter aftertaste is weak and the sharp bitterness is strong.

When the iso-α-acid content is less than 15 ppm, the bitter aftertaste is strong regardless of the ethyl glucoside content.

When the iso-α-acid content is 15 to 30 ppm, the bitter aftertaste tends to be weak. When ethyl glucoside is further contained in an amount of 5 ppm or more, the bitter aftertaste is especially weak and the sharp bitterness is strong. In other words, the quality of bitterness is improved in the region where the iso-α-acid content is 15 to 30 ppm and the ethyl glucoside content is 5 ppm or more.

When the iso-α-acid content is more than 30 ppm, a high iso-α-acid content relative to ethyl glucoside results in a strong bitter aftertaste. Specifically, a ratio of iso-α-acid to ethyl glucoside (iso-α-acid/ethyl glucoside) of more than 6.0 results in a strong bitter aftertaste. When the iso-α-acid content is more than 30 ppm and 60 ppm or less, a ratio of iso-α-acid to ethyl glucoside (iso-α-acid/ethyl glucoside) of 6.0 or less results in an improved quality of bitterness.

When the iso-α-acid content is more than 60 ppm, a high ethyl glucoside content is required to improve the quality of bitterness. In such a case, the astringency will be strongly perceived.

While ethyl glucoside has an effect of improving the quality of bitterness when the iso-α-acid content is 15 ppm or more, a high ethyl glucoside content may give strong astringency. Specifically, a non-alcoholic beer-taste beverage having an ethyl glucoside content of more than 50 ppm has strong astringency.

Thus, the non-alcoholic beer-taste beverage of the present invention has an ethyl glucoside content of 50 ppm or less.

As described above, a non-alcoholic beer-taste beverage having an improved quality of bitterness and reduced astringency can be provided when the iso-α-acid content and the ethyl glucoside content are in the predetermined ranges.

When the iso-α-acid content is 20 to 30 ppm and the ethyl glucoside content is 10 to 25 ppm, the smell of wort can be reduced. Non-alcoholic beer-taste beverages contain more aldehydes that smell like wort than regular beer-taste beverages, so that the smell of wort may be strongly perceived. However, the smell of wort can be reduced by setting the iso-α-acid content and the ethyl glucoside content of such a beverage having a strong smell of wort in the predetermined ranges.

A common process of producing a non-alcoholic beer-taste beverage is described below.

A non-alcoholic beer-taste beverage can be easily produced because fermentation with yeast is not involved.

When producing a non-alcoholic beer-taste beverage, first, a mixture containing ingredients (e.g., cereal grains such as malt and other grains, starch, sugars, bittering agents, and coloring agents) and water is provided, and an enzyme such as amylase is added to the mixture as needed to cause gelatinization and saccharification, followed by filtration to obtain wort. Hops, a bittering agent, and the like are added to the wort as needed. Then, the wort is boiled, and solids content such as coagulated protein is removed in a settling tank. As an alternative to the wort, a malt extract to which hot water has been added may be mixed with hops and boiled. Hops may be mixed at any time from the start of boiling to immediately before the end of boiling. Known conditions may be applied to saccharification, boiling, solids content removal, and the like. After boiling, the resulting wort is filtered, and the resulting filtrate is mixed with a carbon dioxide gas. Thereafter, the resulting mixture is packaged in a container and sterilized to obtain a desired non-alcoholic beer-taste beverage.

An aliphatic alcohol may be added to the non-alcoholic beer-taste beverage of the present invention to impart the alcohol-like texture to the beverage. The aliphatic alcohol may be any known aliphatic alcohol but is preferably a C4-C5 aliphatic alcohol. Preferred aliphatic alcohols in the present invention include 2-methyl-1-propanol and 1-butanol as C4 aliphatic alcohols and 3-methyl-1-butanol, 1-pentanol, and 2-pentanol as C5 aliphatic alcohols. These can be used alone or in combination of two or more thereof.

The C4-C5 aliphatic alcohol content is preferably 0.0002 to 0.0007 mass %, more preferably 0.0003 to 0.0006 mass %. Herein, the aliphatic alcohol content can be measured by headspace gas chromatography.

The non-alcoholic beer-taste beverage of the present invention is preferably low in calories to suit the recent preference for low-calorie products. The non-alcoholic beer-taste beverage of the present invention therefore has a calorie content of preferably less than 5 kcal/100 mL, more preferably less than 4 kcal/100 mL, still more preferably less than 3 kcal/100 mL.

The calorie content of the non-alcoholic beer-taste beverage of the present invention is basically calculated in accordance with "Method for Analysis of Components such as Nutritional Components and the like under the Nutrition Labeling Standards" which was published in connection with the Health Promotion Act in Japan. In other words, in principle, the calorie content can be calculated as a sum of the products of the quantified amounts of the nutritional components multiplied by the energy conversion coefficients of the respective components (protein: 4 kcal/g; fat: 9 kcal/g; sugar: 4 kcal/g; dietary fiber: 2 kcal/g; alcohol: 7 kcal/g; organic acid: 3 kcal/g). The details are described in "Method for Analysis of Components such as Nutritional Components and the like under the Nutrition Labeling Standards".

The specific method of measuring the amount of each nutritional component contained in the non-alcoholic beer-taste beverage of the present invention may be in accordance with various analytical methods described in "Method for Analysis of Components such as Nutritional Components and the like under the Nutrition Labeling Standards" of the Health Promotion Act. Japan Food Research Laboratories can provide, upon request, data on the calorie contents and/or the amounts of nutritional components.

The sugar contained in the non-alcoholic beer-taste beverage of the present invention means a sugar based on the Nutrition Labeling Standards for Foods (Ministry of Health, Labor and Welfare, Notification No. 176, 2003). Specifically, the sugar refers to a component which remains after the protein, fat, dietary fiber, ash content, alcohol content, and moisture content are removed from a food. The amount of sugar in food is calculated by subtracting the amounts of protein, fat, dietary fiber, ash content, and moisture content from the weight of the food. In this case, the amounts of protein, fat, dietary fiber, ash content, and moisture content are measured by the methods under the Nutrition Labeling Standards. Specifically, the amount of protein is measured by the nitrogen quantification conversion method. The amount of fat is measured by an ether extraction method, a chloroform-methanol liquid mixture extraction method, the Gerber method, an acid decomposition method, or the Roese-Gottlieb method. The amount of dietary fiber is measured by high performance liquid chromatography or the Prosky method. The amount of ash content is measured by a method of ashing with magnesium acetate, a direct ashing method, or a method of ashing with sulfuric acid. The amount of moisture content is measured by the Karl Fischer method, a method using a drying aid, a vacuum thermal drying method, an atmospheric thermal drying method, or a plastic film method.

The non-alcoholic beer-taste beverage of the present invention may be low in sugars to suit a preference in recent years for low-sugar options. The non-alcoholic beer-taste beverage of the present invention may have a sugar content of less than 2.5 g/100 mL or less than 0.5 g/100 mL. The lower limit is not limited but is usually about 0.1 g/100 mL and may be, for example, 0.15 g/100 mL or more, or 0.2 g/100 mL or more.

The non-alcoholic beer-taste beverage of the present invention may contain an acidulant. The acidulant is preferably at least one acid selected from the group consisting of citric acid, lactic acid, phosphoric acid, and malic acid. In the present invention, acids other than the acids described above, such as succinic acid, tartaric acid, fumaric acid, or glacial acetic acid, can also be used. Any of these can be used without limitation, as long as they are approved as food additives. In the present invention, preferred is a combination of lactic acid, which appropriately imparts a mild sour flavor, and phosphoric acid, which appropriately imparts a slightly tingling sour flavor.

The acidulant content of the non-alcoholic beer-taste beverage of the present invention in equivalent to citric acid is preferably 200 ppm or more, more preferably 550 ppm or more, still more preferably 700 ppm or more in order to impart the beer-like taste. The acidulant content is preferably 15000 ppm or less, more preferably 5500 ppm or less, still more preferably 2000 ppm or less in terms of sour flavor. The acidulant content of the present invention in equivalent to citric acid therefore falls within a range of 200 ppm to 15000 ppm, preferably 550 ppm to 5500 ppm, more preferably 700 ppm to 1500 ppm, for example. The "content in equivalent to citric acid" is an amount calculated from the degree of the sour flavor of each acidulant based on the degree of the sour flavor of citric acid. For example, a lactic acid content of 100 ppm corresponds to an amount of 120 ppm in equivalent to citric acid. A phosphoric acid content of 100 ppm corresponds to an amount of 200 ppm in equivalent to citric acid. A malic acid content of 100 ppm corresponds to an amount of 125 ppm in equivalent to citric acid.

The acidulant content of a non-alcoholic beer-taste beverage refers to one calculated based on analysis by high performance liquid chromatography (HPLC) or the like.

In the non-alcoholic beer-taste beverage of the present invention, hops can be used as one of the ingredients. When hops are used, hop pellets, hop powder, and hop extracts usually used in production of beer and the like can be appropriately selected according to the desired aroma and taste. Alternatively, processed hop products such as isomeric hops and reduced hops may be used. The hops used in the non-alcoholic beer-taste beverage of the present invention include these hops. The amount of hops to be added is not limited but is typically about 0.0001 to 1 wt % based on the total amount of the beverage.

The non-alcoholic beer-taste beverage of the present invention may contain any other ingredients as needed, as long as the effect of the present invention is not impaired. For example, sweeteners (including high-intensity sweeteners), bittering agents, flavorings, yeast extracts, colorants such as caramel color, plant-extracted saponin-based substances such as soybean saponin and quillaja saponin, substances containing proteins and peptides from plants such as corn and soybean, protein-based substances such as bovine serum albumin, seasonings such as dietary fiber and amino acids, and antioxidants such as ascorbic acid can be used as needed, as long as the effect of the present invention is not impaired.

The non-alcoholic beer-taste beverage of the present invention can be packaged in a container. The form of the container is not limited. The non-alcoholic beer-taste beverage can be packed in a sealed container such as a bottle, can, keg, or plastic bottle, whereby a packaged beverage can be obtained.

The non-alcoholic beer-taste beverage of the present invention may be produced by any method. For example, iso-α-acid and ethyl glucoside may be added as needed to adjust the iso-α-acid and the ethyl glucoside content in the predetermined ranges.

A method of producing a non-alcoholic beer-taste beverage, which includes adjusting an iso-α-acid concentration and an ethyl glucoside concentration of a non-alcoholic beer-taste beverage such that the non-alcoholic beer-taste beverage has an iso-α-acid content of 15 to 60 ppm, an ethyl glucoside content of 5 to 50 ppm, and a ratio of iso-α-acid to ethyl glucoside (iso-α-acid/ethyl glucoside) of 6.0 or less, is a method of producing the non-alcoholic beer-taste beverage of the present invention.

A method of improving the quality of bitterness of a non-alcoholic beer-taste beverage, which includes adding iso-α-acid and ethyl glucoside to a non-alcoholic beer-taste beverage such that the non-alcoholic beer-taste beverage contains 15 to 60 ppm iso-α-acid and 5 to 50 ppm ethyl glucoside at a ratio of iso-α-acid to ethyl glucoside (iso-α-acid/ethyl glucoside) of 6.0 or less, is a method of improving the quality of bitterness of the non-alcoholic beer-taste beverage of the present invention.

In the method of producing a non-alcoholic beer-taste beverage of the present invention, and the method of improving the quality of bitterness of a non-alcoholic beer-taste beverage of the present invention, more preferred concentration ranges of iso-α-acid and ethyl glucoside and other preferred embodiments are as described above for the non-alcoholic beer-taste beverage of the present invention.

EXAMPLES

Hereinafter, the present invention is specifically described with reference to examples, but the present invention is not limited to the following examples.

In the examples, ethyl glucoside was ethyl-α-D-glucoside (hereinafter sometimes described as EG). In the examples, water was pure water.

A commercially available non-alcoholic beer-taste beverage was subjected to addition of iso-α-acid and ethyl glucoside, dilution with pure water, and the like, as needed, to prepare samples each having an iso-α-acid content and an ethyl glucoside content adjusted to predetermined values.

Two panelists experienced in sensory evaluation performed sensory evaluation on the bitterness and astringency of the samples. In the sensory evaluation, each panelist tasted the sample (10 mL) in the mouth for five seconds, spit out the sample, and evaluated the bitterness intensity and the astringency intensity. When evaluating a different sample, each panelist rinsed the mouth with water until the taste in the mouth disappeared.

The bitterness and the astringency were evaluated with 0.5 increments according to the following evaluation criteria (1 to 5 points). Then, the scores given by the panelists were averaged.

Bitterness 1 point: Bitter aftertaste was strongly perceived; or sharp bitterness was not perceived at all.

2 points: Bitter aftertaste was perceived; or sharp bitterness was not much perceived.

3 points: Bitter aftertaste was not perceived, and sharp bitterness was slightly perceived.

4 points: Bitter aftertaste was not perceived, and sharp bitterness was perceived.

5 points: Bitter aftertaste was not perceived, and sharp bitterness was strongly perceived.

Astringency 1 point: Very strongly perceived.

2 points: Strongly perceived.

3 points: Perceived.

4 points: Slightly perceived.

5 points: Not perceived at all.

For the sensory evaluation, the panelists exchanged views in advance, and the astringency intensity and bitterness intensity of the pure water (free of iso-α-acid and ethyl glucoside) used in preparation of the samples were both given 1 point as the standard points.

TABLE 1

| | | | EG (ppm) | | | | | | | |
|---|---|---|---|---|---|---|---|---|---|---|
| | | | 0 | 2.5 | 5 | 10 | 25 | 50 | 100 | 200 |
| Iso-α-acid (ppm) | 0 | Bitterness | 1.00 | 1.00 | 1.00 | 1.00 | 1.00 | 1.00 | 1.00 | 1.00 |
| | | Astringency | 5.00 | 5.00 | 5.00 | 5.00 | 5.00 | 5.00 | 5.00 | 5.00 |
| | | Iso-α-acid/EG | — | 0.00 | 0.00 | 0.00 | 0.00 | 0.00 | 0.00 | 0.00 |
| | 5 | Bitterness | 1.00 | 1.00 | 1.00 | 1.00 | 1.00 | 1.00 | 1.00 | 1.00 |
| | | Astringency | 5.00 | 5.00 | 5.00 | 4.75 | 4.00 | 3.00 | 2.50 | 1.75 |
| | | Iso-α-acid/EG | — | 2.00 | 1.00 | 0.50 | 0.20 | 0.10 | 0.05 | 0.03 |
| | 10 | Bitterness | 2.00 | 2.00 | 2.00 | 2.25 | 2.50 | 2.75 | 3.00 | 3.00 |
| | | Astringency | 5.00 | 5.00 | 5.00 | 4.50 | 3.50 | 3.00 | 2.50 | 1.75 |
| | | Iso-α-acid/EG | — | 4.00 | 2.00 | 1.00 | 0.40 | 0.20 | 0.10 | 0.05 |
| | 15 | Bitterness | 2.50 | 2.75 | 3.25 | 3.25 | 3.25 | 3.75 | 3.75 | 4.00 |
| | | Astringency | 5.00 | 5.00 | 5.00 | 4.50 | 3.50 | 3.50 | 2.25 | 1.50 |
| | | Iso-α-acid/EG | — | 6.00 | 3.00 | 1.50 | 0.60 | 0.30 | 0.15 | 0.08 |
| | 20 | Bitterness | 3.00 | 3.00 | 3.50 | 3.50 | 3.75 | 4.00 | 4.25 | 4.50 |
| | | Astringency | 5.00 | 5.00 | 5.00 | 5.00 | 4.00 | 4.00 | 2.50 | 1.00 |
| | | Iso-α-acid/EG | — | 8.00 | 4.00 | 2.00 | 0.80 | 0.40 | 0.20 | 0.10 |
| | 25 | Bitterness | 2.50 | 2.75 | 3.25 | 3.50 | 3.50 | 4.00 | 4.00 | 4.00 |
| | | Astringency | 5.00 | 5.00 | 5.00 | 5.00 | 3.75 | 3.75 | 2.25 | 1.75 |
| | | Iso-α-acid/EG | — | 10.00 | 5.00 | 2.50 | 1.00 | 0.50 | 0.25 | 0.13 |
| | 30 | Bitterness | 2.00 | 3.00 | 3.50 | 3.75 | 4.00 | 4.00 | 3.50 | 3.25 |
| | | Astringency | 5.00 | 5.00 | 5.00 | 4.50 | 3.75 | 3.25 | 2.25 | 1.75 |
| | | Iso-α-acid/EG | — | 12.00 | 6.00 | 3.00 | 1.20 | 0.60 | 0.30 | 0.15 |

TABLE 1-continued

| | | EG (ppm) | | | | | | | |
|---|---|---|---|---|---|---|---|---|---|
| | | 0 | 2.5 | 5 | 10 | 25 | 50 | 100 | 200 |
| 45 | Bitterness | 1.50 | 2.00 | 2.50 | 3.50 | 4.00 | 3.50 | 4.00 | 4.00 |
| | Astringency | 5.00 | 5.00 | 5.00 | 5.00 | 4.50 | 3.50 | 3.00 | 3.00 |
| | Iso-α-acid/EG | — | 18.00 | 9.00 | 4.50 | 1.80 | 0.90 | 0.45 | 0.23 |
| 60 | Bitterness | 1.00 | 1.50 | 2.00 | 3.25 | 3.25 | 3.25 | 3.75 | 3.75 |
| | Astringency | 5.00 | 5.00 | 5.00 | 5.00 | 4.50 | 3.75 | 3.00 | 3.00 |
| | Iso-α-acid/EG | — | 24.00 | 12.00 | 6.00 | 2.40 | 1.20 | 0.60 | 0.30 |
| 90 | Bitterness | 1.00 | 1.00 | 1.75 | 1.75 | 1.75 | 2.00 | 2.00 | 2.00 |
| | Astringency | 5.00 | 5.00 | 5.00 | 5.00 | 4.00 | 3.50 | 3.50 | 2.50 |
| | Iso-α-acid/EG | — | 36.00 | 18.00 | 9.00 | 3.60 | 1.80 | 0.90 | 0.45 |

The bitterness was highly evaluated with the score of 3.25 or more and the astringency was also highly evaluated with the score of 3.25 or more in the region in Table 1 where the iso-α-acid content is 15 to 60 ppm, the ethyl glucoside content is 5 to 50 ppm, and the ratio of iso-α-acid to ethyl glucoside (iso-α-acid/ethyl glucoside) is 6.0 or less.

Either bitterness or astringency was poorly evaluated outside the above region.

The results show that non-alcoholic beer-taste beverages with an improved quality of bitterness and reduced astringency were obtained when the iso-α-acid content, the ethyl glucoside content, and the ratio of iso-α-acid to ethyl glucoside were set in the predetermined ranges.

Separately from the above evaluation, a commercially available non-alcoholic beer-taste beverage having a relatively strong smell of wort was subjected to addition of iso-α-acid and ethyl glucoside, dilution with pure water, and the like, as needed, to prepare samples each having an iso-α-acid content and an ethyl glucoside content adjusted to predetermined values.

The results show that an effect of reducing the smell of wort was observed when the iso-α-acid content was 20 ppm to 30 ppm and the ethyl glucoside content was 10 ppm to 25 ppm.

INDUSTRIAL APPLICABILITY

The present invention can provide a non-alcoholic beer-taste beverage having an improved quality of bitterness.

The invention claimed is:

1. A non-alcoholic beer-taste beverage, comprising:
   an iso-α-acid content of 15 to 60 ppm; and
   an ethyl glucoside content of 5 to 50 ppm,
   wherein a ratio of iso-α-acid to ethyl glucoside is 6.0 or less, provided that the α-acid content and the ethyl glucoside content satisfy said content ranges, respectively.

2. The non-alcoholic beer-taste beverage according to claim 1,
   wherein the iso-α-acid content is 20 to 30 ppm; and
   the ethyl glucoside content is 10 to 25 ppm.

3. A method of producing a non-alcoholic beer-taste beverage, comprising:
   adjusting an iso-α-acid concentration and an ethyl glucoside concentration in a non-alcoholic beer-taste beverage such that the non-alcoholic beer-taste beverage has an iso-α-acid content of 15 to 60 ppm, an ethyl glucoside content of 5 to 50 ppm, and a ratio of iso-α-acid to ethyl glucoside of 6.0 or less.

4. A method of improving quality of bitterness of a non-alcoholic beer-taste beverage, comprising:
   adding iso-α-acid and ethyl glucoside to a non-alcoholic beer-taste beverage such that the non-alcoholic beer-taste beverage contains 15 to 60 ppm iso-α-acid and 5 to 50 ppm ethyl glucoside at a ratio of iso-α-acid to ethyl glucoside of 6.0 or less.

\* \* \* \* \*